M. P. HAYWARD.
FRYING PAN.
APPLICATION FILED JUNE 27, 1914.
1,173,662.
Patented Feb. 29, 1916.
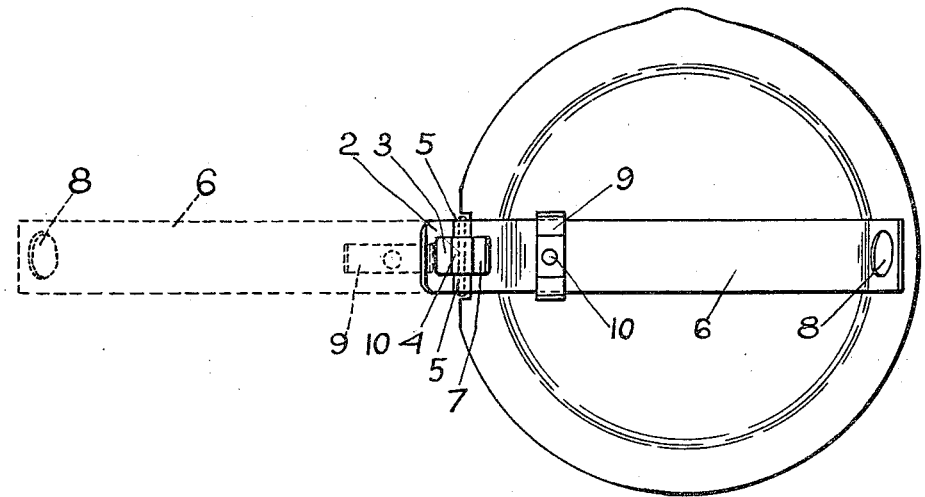
Fig.1
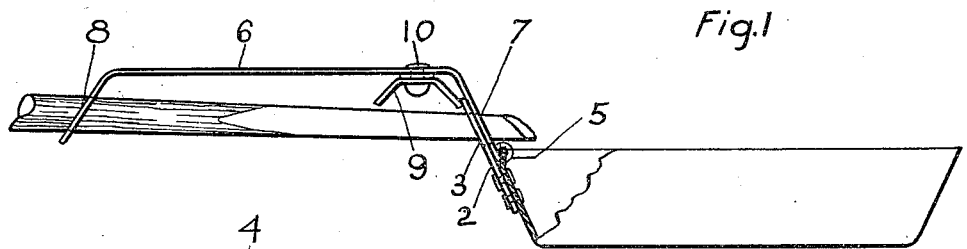
Fig.2
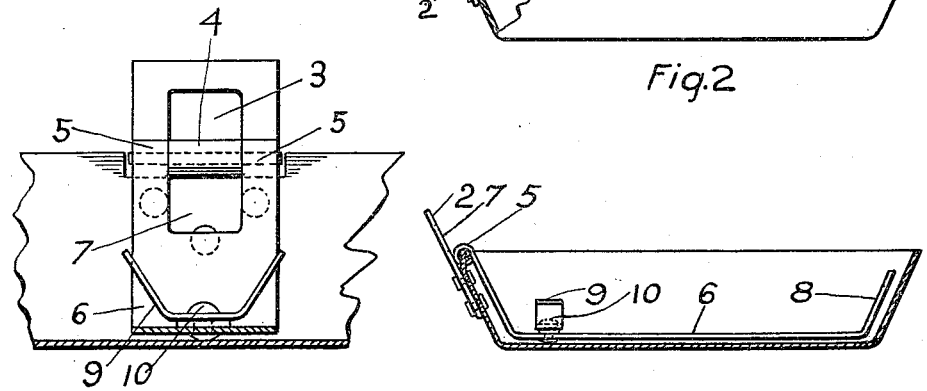
Fig.4.
Fig.3.
WITNESSES:
Geo. E. Stebbins
Eloie Press
INVENTOR.
Melville P. Hayward
BY
Phillips Van Curen Fish
ATTORNEYS.
THE COLUMBIA PLANOGRAPH CO., WASHINGTON, D. C.

UNITED STATES PATENT OFFICE.

MELVILLE P. HAYWARD, OF QUINCY, MASSACHUSETTS.

FRYING-PAN.

1,173,662.  Specification of Letters Patent.  Patented Feb. 29, 1916.

Application filed June 27, 1914. Serial No. 847,606.

*To all whom it may concern:*

Be it known that I, MELVILLE P. HAYWARD, a citizen of the United States, residing at Quincy, in the county of Norfolk and State of Massachusetts, have invented certain new and useful Improvements in Frying-Pans; and I do hereby declare the following to be a full, clear, and exact description of the invention, such as will enable others skilled in the art to which it appertains to make and use the same.

The present invention relates to hinged handle frying pans.

The most desirable feature in all camping paraphernalia is compactness which does not infringe upon usefulness.

By my invention I have produced for camp and similar use a new frying pan, in which in providing for its compactness, when it is folded for packing, I have not sacrificed any of its serviceableness. This is made possible by making the handle portion of the frying pan of a suitable length and shaping its ends so that when it is arranged upon a hinge it will fold into and lie flat along the dish portion, thereby permitting other articles to be packed in the pan, consequently making it especially desirable for campers, prospectors and the like.

Hitherto in making frying pans with hinged handles a weak feature has lain in the liability of the handle and the body portion of the frying pan folding together while in use. By means of a peculiar device I obviate all danger of this happening; and furthermore, by reason of the structure of the handle I make the pan more convenient for actual use by providing two holes therein so that a stick or other support may be projected therethrough and the pan held over the camp fire, either by hand or by crotch and hook supports, without any liability of the pan tilting and spilling its contents.

In the accompanying drawings Figure 1 is a plan view of my improved frying pan with the handle folded and showing in dotted lines the position of the handle when it is open; Fig. 2 is a side elevation of the pan with a portion of the pan shown in section; Fig. 3 is a sectional elevation of the pan with the handle folded; and Fig. 4 is a sectional elevation of a portion of the pan looking toward the hinge.

The body-portion of the pan in the illustrated embodiment of the invention is made of stamped and spun steel; attached to one side of the pan and projecting upwardly therefrom is a handle stay or back rest 2 which may be made integral with the pan, but which is preferably a separate piece riveted to the pan by three rivets. The upper portion of this stay has a rectangular hole 3, the metal being cut away entirely on three sides, leaving the piece attached at its bottom end to the stay. This piece of metal is rolled up to form a hinge member 4 having a central pintle opening the size of the pintle of the handle hinge member 5. The handle 6 is formed of sheet metal the pan end of which is rectangularly bifurcated at 7; the end of each tine of the fork being turned up to form the outside sections 5 of a hinge member and also having a central hole the size of the pintle of the hinge. When this end of the handle is placed in position with relation to the stay and the pintle of the hinge is driven through, the aperture of the rest or stay and the rectangular bifurcation 7 of the handle register. The edge of the pan is notched so as to receive the hinge of the handle in the notch, and after the pintle has been inserted in place, the corners of the notch are bent inward slightly as seen in Figs. 1 and 2 so as to come opposite the two ends of the pintle so as thereby to hold the pintle from accidental removal. In the other end of the handle is a round hole 8 in alinement with the other two holes 3 and 7 when the handle is in open position, so that a stick may readily be inserted through the holes, the rectangular hole preventing the frying pan from turning on the stick.

A locking device consisting of a double-ended swivel 9 is loosely connected to the handle by the rivet 10 and is held a slight distance from the handle by an interposed washer. This swivel is made of a piece of sheet metal and is bent up at both ends, as shown in Figs. 1 and 3, each end being equally distant from the pivot hole. The angular position of the ends with relation to the middle portion of the swivel is the same that the bent ends of the handle bear to the middle of the handle so that when the swivel lies longitudinally of the handle the corresponding ends of the swivel and of the handle are parallel. This enables the end of the swivel which is in operation when the handle is in locked position to lie flat against the back rest 2 as seen in Fig. 1. The distance between the pivot and the back part of the stay 2 is such that when the handle is in open position and the locking device is swung into place, whichever end of the swivel comes into play against the back of the stay fits tightly against it and the handle is thereby rigidly locked. In order to swing the swivel into this position it is necessary to exert some little pressure to force the corners of the ends of the swivel by at the point of contact with the stay or rest. The resiliency of the material of which the swivel is composed, however, permits this and when the swivel lies longitudinally of the handle, after having been forced fully into operative position. the metal springing back into its normal position presses the end of the swivel tightly against the outer side of the back rest. There is no danger, therefore, when the handle is in a locked position, of the swivel jarring or being knocked out of place accidentally, thereby unlocking the pan and handle.

It will be observed that the handle is so constructed that its bent ends allow it to fit nicely into the dish-portion of the pan, thus permitting other utensils to be packed away on top of it.

Having thus described the invention, what is claimed is:—

1. A frying pan consisting of a body portion, a handle, a hinge by which the handle is pivotally secured to the body portion, and a swivel device pivotally mounted on the handle independent of the hinge adapted to lock the handle in open position against the pan.

2. A pan consisting of a body-portion provided with a stay and a handle with bent ends hinged thereto, a double-ended swivel carried by the handle the ends of the swivel being parallel with the ends of the handle when the swivel lies longitudinally of the handle and adapted to be forced into position against the stay to lock the handle in operative position.

3. A pan consisting of a body-portion provided with a stay projecting upwardly therefrom, and having a rectangular shaped hole in the upper portion thereof, and a handle secured to the stay and having a rectangular hole registering with the stay and means for locking the handle against the stay.

4. A pan comprising a body-portion provided with a stay projecting upwardly therefrom and having a rectangular hole in the upper portion thereof, a handle hinged to the stay, the handle being provided with a hole at both ends so that when said handle lies against the stay all the holes are in alinement.

5. A frying pan comprising a body-portion provided with a stay projecting upwardly therefrom, a hole in the upper part of the stay, a handle pivotally secured to the front of and at the lower edge of the hole, the handle having two bent ends so that when the handle is in a closed position, it is adapted to lie within the body-portion of the pan.

6. A pan comprising a dish-shaped portion provided with a handle hinged thereto, the ends of said handle being bent and provided with holes, one end with a rectangular hole and the other end with a circular hole, the holes being in alinement, and a double-ended swivel, whose ends are parallel to the ends of the handle when the swivel lies longitudinally of the handle, carried by the handle and adapted to lock it in an open position against the pan.

7. A frying pan consisting of a body portion provided with a stay projecting upwardly therefrom, said body portion having a hinge notch cut into the rim thereof, said stay having a hinge bearing projecting into the hinge notch, and a handle pivoted in the hinge bearing of the stay.

8. A frying pan consisting of a body portion having a hinge notch, a handle hinged to the pan on a hinge pintle with the hinge located in the hinge notch, the corners of the pan being bent to hold the hinge pintle in place.

9. A frying pan consisting of a body portion provided with a stay propecting upwardly therefrom, and having a hole in the upper portion thereof, a handle hinged to the stay, the handle being provided with a hole at both ends so that when the handle lies against the stay, all the holes are in alinement to receive a stick.

10. A frying pan consisting of a body portion having a hole in the upper portion thereof, and a handle hinged to the body portion below the hole, the handle being provided with a hole at both ends so that when the handle lies against the body portion, all the holes are in alinement and adapted to receive a stick, whereby the handle is locked in open position.

MELVILLE P. HAYWARD.

Witnesses:
HORACE VAN EVEREN,
GEO. E. STEBBINS.

Copies of this patent may be obtained for five cents each, by addressing the "Commissioner of Patents, Washington, D. C."